United States Patent [19]
Fuchs et al.

[11] Patent Number: 5,373,733
[45] Date of Patent: Dec. 20, 1994

[54] EXHAUST FILTER BACKPRESSURE INDICATOR

[75] Inventors: Ervin P. Fuchs, Farmington; Edward A. Steinbrueck, Eden Prairie; Wayne M. Wagner, Apple Valley, all of Minn.

[73] Assignee: Donaldson Company, Inc., Minneapolis, Minn.

[21] Appl. No.: 999,390

[22] Filed: Dec. 31, 1992

[51] Int. Cl.$^5$ ............................................. G01M 15/00
[52] U.S. Cl. ..................................... 73/118.1; 73/49.7
[58] Field of Search ............... 73/118.1, 49.7; 60/277, 60/291, 294, 311; 55/DIG. 10

[56] References Cited

U.S. PATENT DOCUMENTS

| | | |
|---|---|---|
| 4,319,896 | 3/1982 | Sweeney . |
| 4,326,378 | 4/1982 | Sweeney . |
| 4,424,671 | 1/1984 | Tokura . |
| 4,492,079 | 1/1985 | Takagi et al. ............... 60/311 |
| 4,842,623 | 6/1989 | Zundel . |
| 4,900,517 | 2/1990 | Domesle et al. . |
| 4,969,328 | 11/1990 | Kammel . |
| 5,211,009 | 5/1993 | Houben et al. ............ 73/118.1 |

FOREIGN PATENT DOCUMENTS 0412345 2/1991 European Pat. Off. .

OTHER PUBLICATIONS

Patent Abstracts of Japan; vol. 011, No. 218 (M-607) 15 Jul. 1987 & JP,A,62 035 009 (Toyota) 16 Feb. 1987.

*Primary Examiner*—Robert Raevis
*Attorney, Agent, or Firm*—Merchant, Gould, Smith, Edell, Welter & Schmidt

[57] ABSTRACT

An exhaust filter backpressure indicator includes a sensor for measuring the backpressure and the exhaust system. The sensor sends a signal which is processed for indicating that an exhaust filter element is filled. The indicator includes a timer so that a signal corresponding to pressure must be maintained for a predetermined period of time before the filled element is indicated. The apparatus may also include high and low frequency discriminators to process signals within predetermined signal frequency ranges corresponding to engine operating speeds. Therefore, depending on the operation of the vehicle, the element will be indicated as being filled at either high engine speed operation or low engine speed operation.

8 Claims, 7 Drawing Sheets

EXHAUST FILTER BACKPRESSURE INDICATOR

BACKGROUND OF THE INVENTION

1. Field of the Invention

The present invention relates to a method and apparatus for indicating whether an exhaust gas filter element is fully loaded.

2. Description of the Prior Art

Exhaust filter elements are utilized to filter particulates and soot from exhaust gases and in particular, diesel exhaust, to clean the exhaust gases before outletting the gases to the atmosphere. If the filters fill with soot and particulates and are fully loaded, the engine flow may be decreased substantially, caused by a build-up of excessive backpressure in the exhaust system which may cause damage to and/or decrease performance of the engine. In order to avoid damage to the engine, sensors may be utilized to measure the backpressure, so that when the pressure exceeds a predetermined amount, the operator of the equipment is signalled to indicate that the backpressure is excessive. The filter is then removed and replaced, or is regenerated so that the backpressure is brought back within an acceptable range.

The prior methods for determining when a filter element becomes fully loaded by utilizing a backpressure sensor has several flaws. For typical operations for diesel forklifts, the engines are operated at full throttle for short bursts or at idle. Therefore, when the accelerator is fully depressed, the backpressure rises substantially from the increased exhaust flow. The high pressure in the exhaust system may exceed its acceptable pressure limit for a short period well before the filter is fully loaded with soot and may indicate replacement or removal of the filter prematurely. In addition, problems also arise when the sensors are used on a variety of different pieces of equipment which have different air flows, backpressure limits and different operating parameters. Also, differences in the way the equipment is operated, such as constantly at full throttle or only occasionally at a higher RPM, may also affect what would be an acceptable performance limit.

It can be seen then, that an exhaust filter backpressure indicator is needed which does not signal false fully-loaded readings. It can also be appreciated that an indicator is needed which can be adapted to and used with a variety of different size engines and which also adapts to a variety of operating conditions.

SUMMARY OF THE INVENTION

The present invention is directed to an apparatus and method for indicating that a filter element has become fully loaded utilizing engine backpressure related to engine operating conditions. An engine exhaust filter is placed in the exhaust system to filter soot and particulates from the exhaust prior to outletting to atmosphere. As the filter becomes loaded with soot, the backpressure may rise to levels which decrease engine performance and/or may cause damage to the engine. Therefore, it is desirable to determine when the filter has become loaded so that it may be cleaned and/or replaced. The present invention utilizes a sensor proximate to the filter to measure backpressure. The sensor sends a signal corresponding to the backpressure which is compared to a set pressure limit. If the measured backpressure exceeds the set point, a timer is actuated. If the backpressure remains above the set pressure limit until the timer has timed through a predetermined period, a signal is sent indicating that the element has become loaded with soot and should be removed. In addition, the apparatus may utilize signal discriminators to test the backpressure only when the engine is operating within predetermined engine RPM ranges.

The timer interval and the backpressure set points may be changed to adapt to different types of equipment and to different operating conditions for the equipment. The indicator is re-set automatically upon removal of the filter for cleaning. Therefore, an operator of the equipment does not need to perform any additional tasks to reset the apparatus.

In a second embodiment of the invention, high and low engine RPM set points are used which have corresponding high and low engine speed timer intervals. In this manner, differences in operating conditions may be taken into account so that the higher RPM range is closer to a full throttle operating conditions and the lower RPM range is closer to an idle or low load throttle operating condition. Each of these may also have an independently set timer interval. When the engine is operating at RPM's producing frequencies within the discriminator range for each of the associated RPM ranges, the timer is actuated when the backpressure limit for those frequencies is exceeded. If the timer at either RPM range is timed out, then an indication of a loaded element is given.

For the embodiment which utilizes two RPM range discriminators, the backpressure at two different frequencies is checked so that different engine operating conditions can be monitored more closely. The intervals and set points for each of these engine speed ranges and the engine speed ranges which are sampled may all be changed independently to adapt to different operating parameters for different engine systems. In this manner, great flexibility is obtained with a relatively simple sampling method and apparatus.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference numerals and letters indicate corresponding elements throughout the several views.

DETAILED DESCRIPTION OF THE PREFERRED EMBODIMENT(S)

Figure 1:
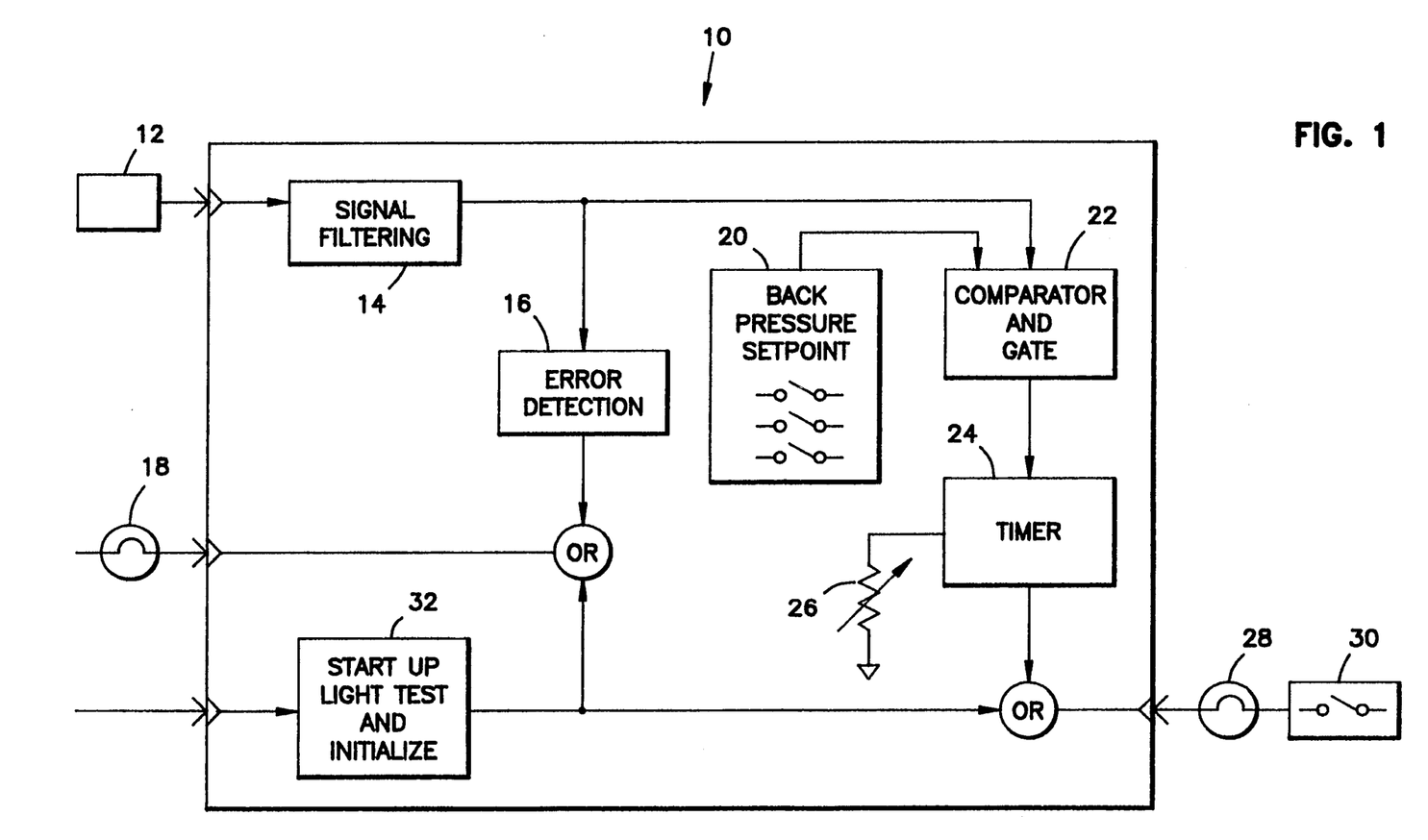
FIG. 1 shows a diagrammatic view of a first embodiment of an exhaust filter backpressure indicator according to the principles of the present invention.

Referring now to the drawings, and in particular to FIG. 1, there is shown a diagram of a first embodiment of an exhaust filter backpressure indicator apparatus, generally designated 10. The exhaust filter backpressure indicator apparatus 10 is utilized to indicate that a filter element is fully loaded. The apparatus 10 has a pressure sensor 12 mounted in the exhaust system proximate to the filter. The indicator apparatus 10 includes an initializer 32, a system check and error circuit 16, and error indicator 18. The backpressure indicator apparatus 10 utilizes a signal filter 14 for filtering pressure signals from the sensor 12 for signal processing. The indicator apparatus 10 has multiple pressure set points 20 for different backpressure limits. The limits may be changed so that the indicator 10 may be adaptable to different size systems. The set limits 20 are compared to the measured pressure at a comparator 22. A timer 24 and interval selector 26 are utilized to measure the period during which the measured pressure exceeds the chosen pressure set point 20. As explained hereinafter, the measured pressure must exceed the pressure set point for a minimum period of time before an indication that the filter is fully loaded.

Upon timing through the period, a signal is transmitted to the loaded filter indicator 28. The indicator 28 signals the operator that the filter element is fully loaded and should be cleaned or replaced. In the preferred embodiment, a reset switch 30 is automatically actuated upon removal of the filter to reset the apparatus 10, so that the operator does not have to perform additional steps to reset the system.

Figure 2:
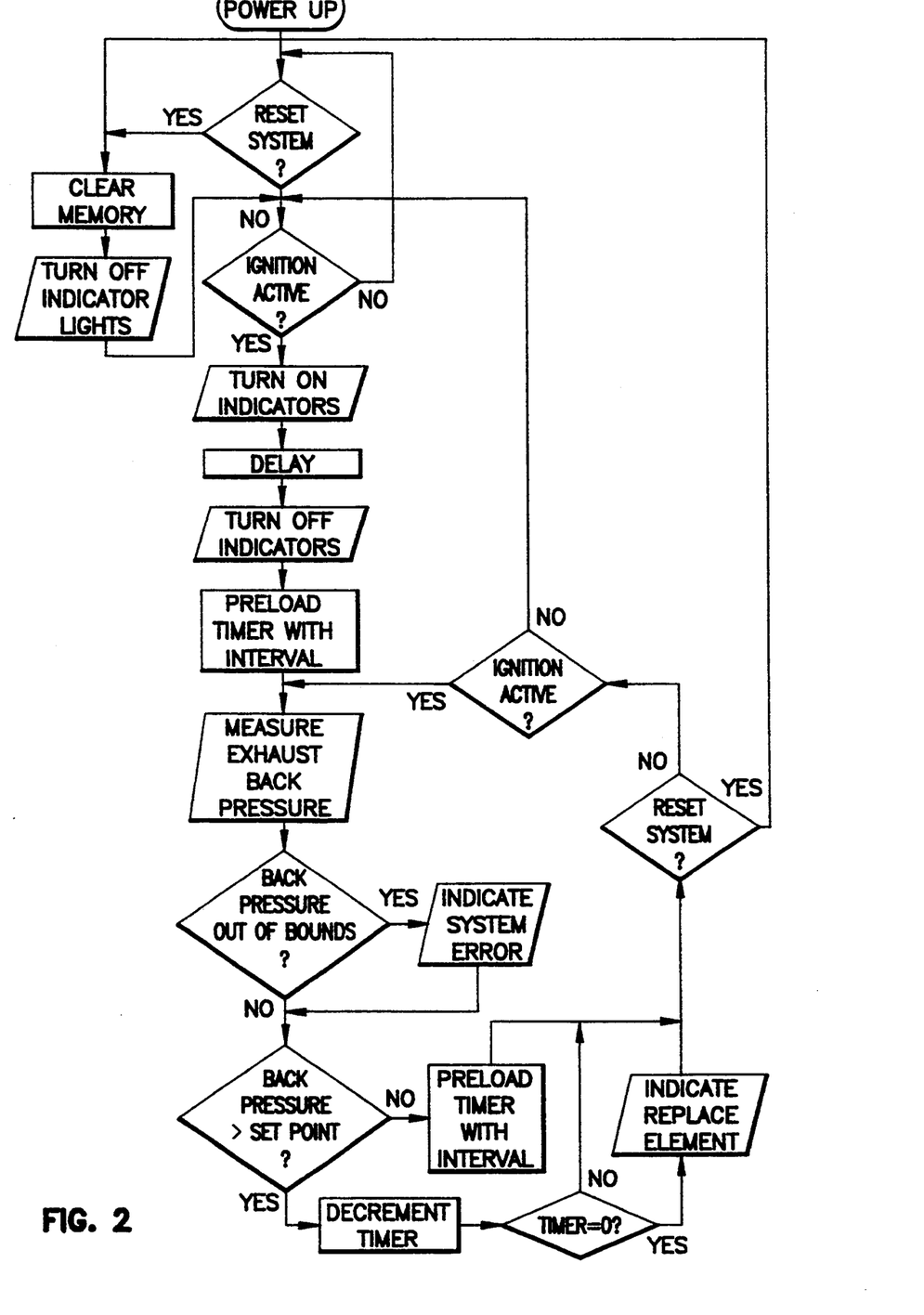
FIG. 2 shows a flow chart of a method of detecting a loaded filter element for use with the embodiment shown in FIG. 1.

Referring now to FIG. 2, there is shown a flow diagram of the testing sequence and sampling steps for the embodiment shown in FIG. 1. When the system is powered up, it will be reset and the lights and indicators will be initialized as indicated in block 32 of FIG. 1. The reset will occur if the element has been replaced, as explained hereinafter. If such a reset is not required, the initialization sequence checks to determine that the ignition for the vehicle or equipment is active. If the ignition is not active, the indicators will not turn on. When the ignition has also been activated, the indicators turn on to indicate whether all lights are working. Following the delay, the indicators are turned off. At that point, the interval selector 26 is loaded with the predetermined interval. The backpressure set points 20 are typically set prior to installation, but may be changed thereafter. The signal which has been filtered at block 14 in FIG. 1 which corresponds to the measured backpressure is compared to the pressure set point 20 at comparator 22. If the measured backpressure is higher than the predetermined limit in the error detection circuit 16 at start-up, the error detection circuit 16 will signal the indicator 18. The operator will then check that the element has been properly cleaned and replaced, or check for other problems with the apparatus.

When the error detection has been completed, the comparator 22 will measure the backpressure against the set point 20. If the backpressure is not greater than the predetermined level, the timer 24 is reloaded and the system is reset, and the process begins again. If the backpressure is greater than the set point, the interval timer 24 is actuated. If the predetermined interval is exceeded, then the replace filter indicator 28 is actuated. If the interval is not exceeded, then the system is reset and the process begins over again. When the indicator 28 has been actuated indicating that the filter should be replaced, the filter is removed and replaced, or cleaned and replaced. Removal or regeneration of the filter automatically actuates the switch 30 to reset the system. The process begins over with a cleaned or regenerated filter or a new replacement filter. In this manner, the operator does not have to take any additional action to reset the system as the indicator automatically resets.

Figure 3:
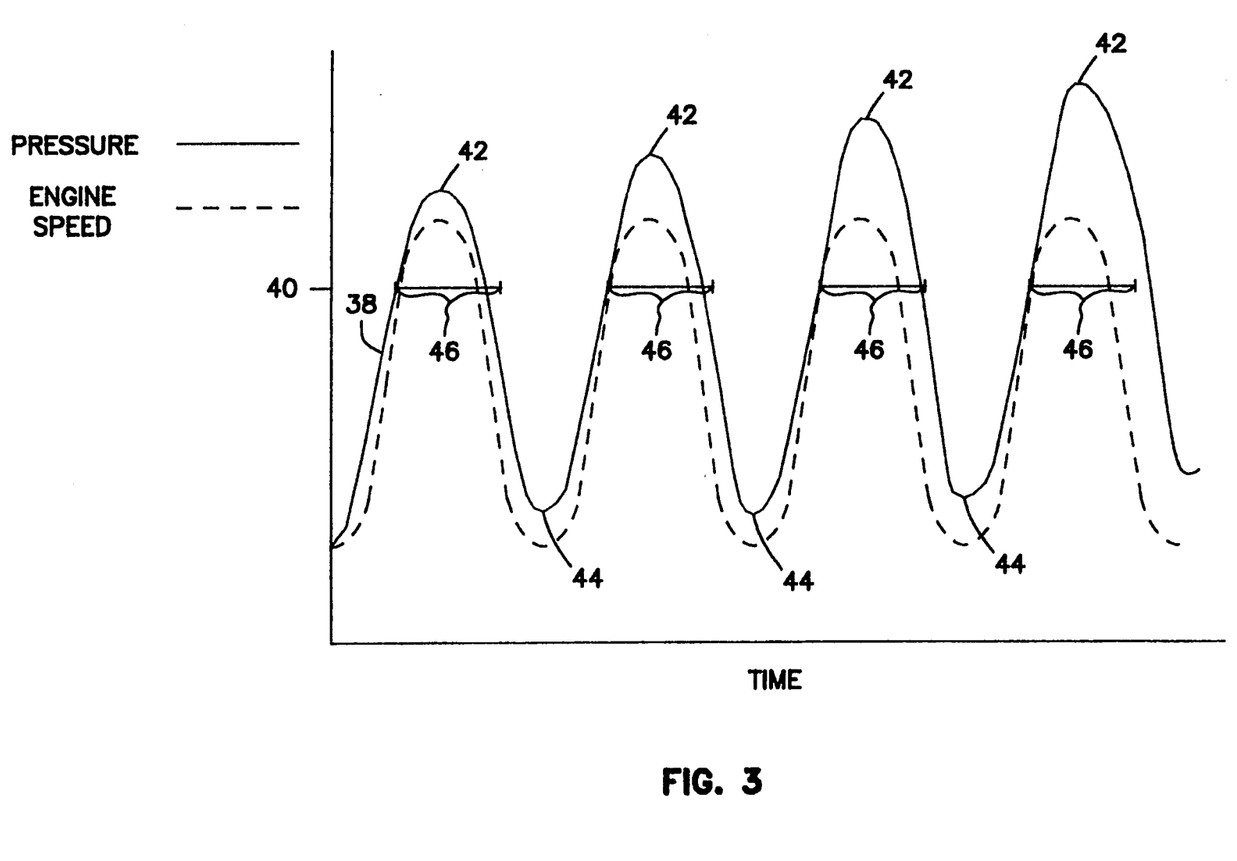
FIG. 3 shows a graph of backpressure corresponding to changing engine speed in a filter element versus time for an interval after the element has been loading for a period of time for the embodiment shown in FIG. 1.

As shown in FIG. 3, pressure 38 is plotted against time as the filter element loads with soot particulate. The time interval represented in FIG. 3 is after a filter element has been loading for a period of time. Although the periods of idle and full throttle are shown having an equal length, it can be appreciated that operating conditions will vary. It can also be appreciated that the graph is exaggerated for illustrative purposes. The pressure peaks 42 represent a full throttle condition while the troughs 44 indicate the operation of the engine at idle. It can be appreciated that as the filter element becomes loaded, the idling pressure 44 rises. In addition, the backpressure at full throttle 42 also increases. Typically, the full throttle pressure 42 rises at a rate faster than the backpressure at idle 44. A predetermined backpressure set point 40, however, remains constant over time.

When the measured backpressure 38 exceeds the set point 40, the timer is activated. When the pressure remains above the set point 40 for a duration greater than a predetermined interval 46, a signal will be sent to the replace filter indicator shown at 28 in FIG. 1, indicating that the filter is fully loaded. The replace filter indicator 28 remains on after the initial timing out of the timer. It can be appreciated that when the interval 46 is not exceeded, the timer resets and the filled element indicator is not actuated.

It can also be appreciated that the length of interval 46 can be adjusted and the pressure set point 40, shown at 20 in FIG. 1, can be independently adjusted so that different ranges may be utilized to indicate a fully loaded filter element. These two parameters can be adjusted so that different operating conditions may be taken into account for different types of work being performed by the equipment.

Figure 4:
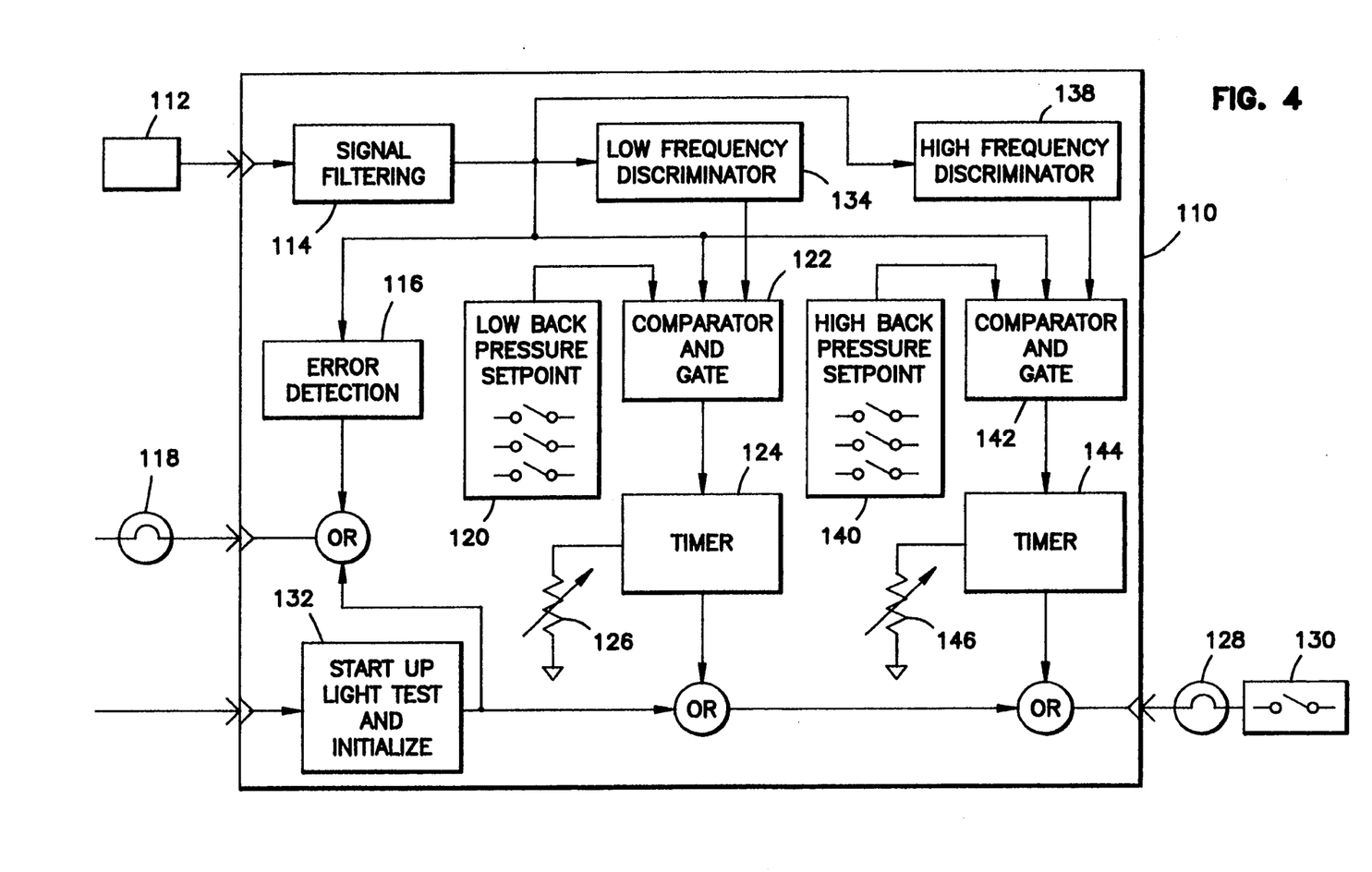
FIG. 4 shows a diagrammatic view of a second embodiment of an exhaust filter backpressure indicator according to the principles of the present invention.

Referring now to FIG. 4, there is shown a second embodiment of the backpressure indicator according to the principles of the present invention, generally designated 110. The second embodiment of the backpressure indicator 110, includes a sensor 112 and a signal filter 114. The indicator 110 also includes an error detection circuit 116 and error indicator 118. Unlike the first embodiment 10, the second embodiment 110 includes a first backpressure trip set point 120 and a second backpressure trip set point 140. In addition, the indicator 110 includes a first comparator 122 and a second comparator 142, as well as a first timer 124 and second timer 144. The indicator 110 also includes a first timed interval selector 126 associated with the timer 124 and second timed interval selector 146 associated with the timer 144. The apparatus has a replacement indicator 128 and a reset 130. The indicator 130 also has an initializer 132, a low frequency discriminator 134 and a high frequency discriminator 138 for monitoring in selected engine operating frequencies.

Figure 5:
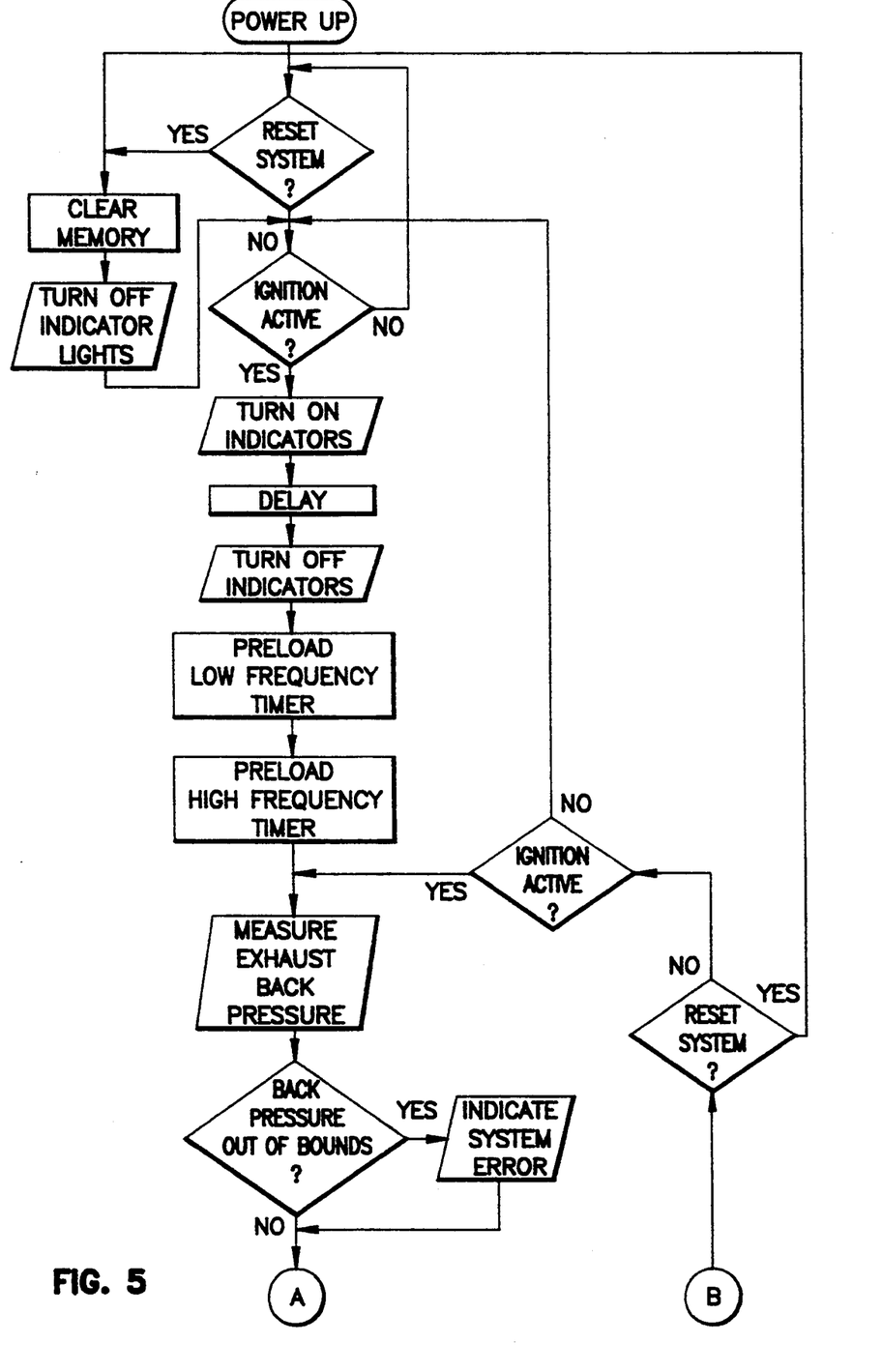
FIG. 5 shows a portion of a flow chart of a method for use with the exhaust filter backpressure indicator shown in FIG. 4.
Figure 6:
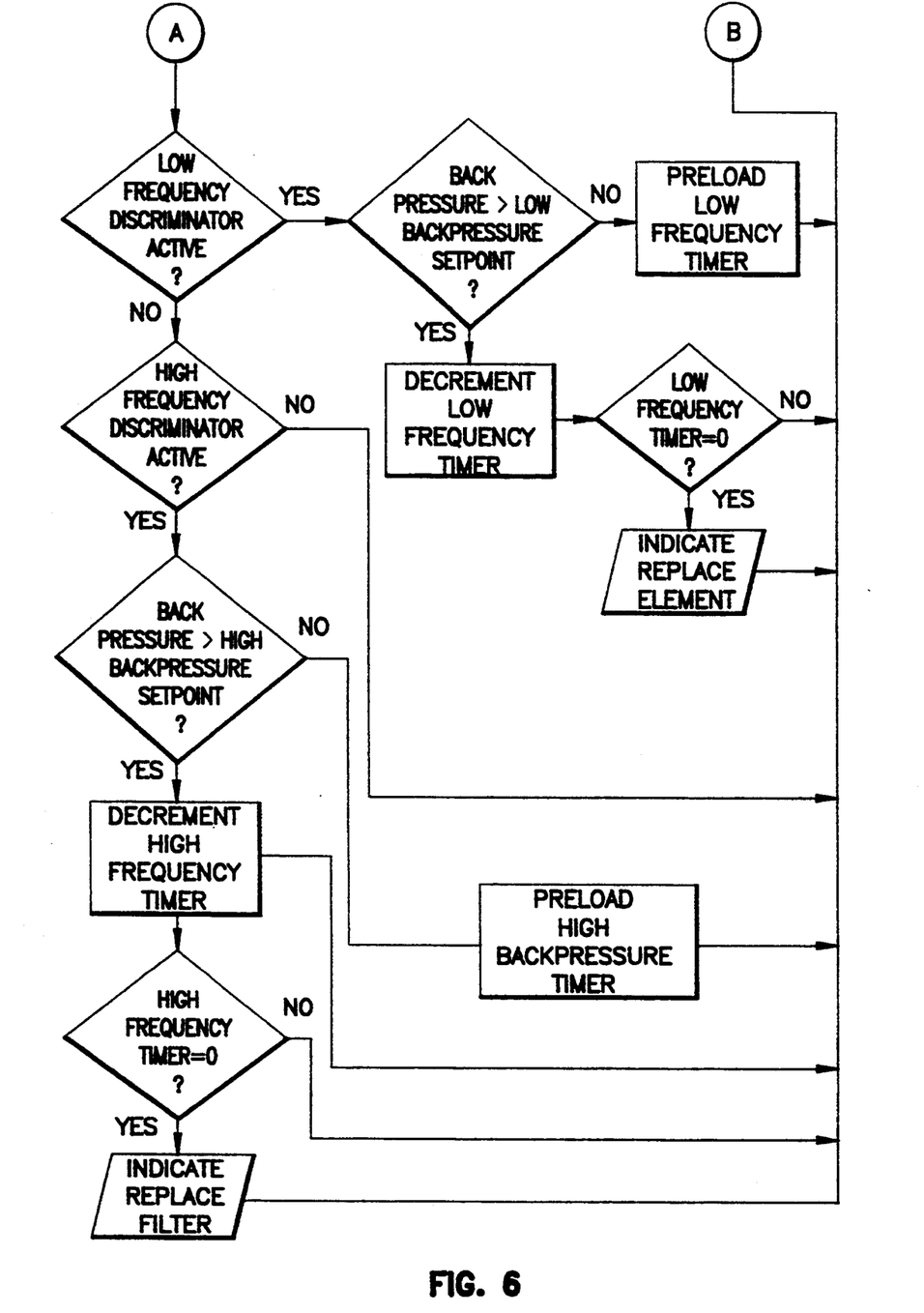
FIG. 6 shows an additional portion of the flow chart shown in FIG. 5.

As shown in FIGS. 5 and 6, the sequence for error detection and backpressure indication is shown for the second embodiment of the indicator 110, shown in FIG. 4. The process for the second embodiment is again started by either resetting the system if the filter has been regenerated or cleaned, or proceeding to check whether the equipment has an active ignition. If the system must be reset, the memory is cleared and the indication lights, which had indicated a filled element, are turned off. If the ignition is not active, the system is reset until the ignition is found to be active. When the ignition has been activated, the indicators are turned on to let the operator check that all lights are working properly. When the indicator lights have been on a sufficient time to check whether they are functioning properly, the indicators are turned off. The low frequency timer 124 is then loaded with an interval and the high frequency timer 144 is loaded with another interval. It can be appreciated that the intervals are separately set so that different intervals may be used for both the high and low frequency timers. It can also be appreciated that since the pressure at higher engine frequency is higher than at lower frequency, the interval for high frequency will be no greater or less than the low frequency interval.

When the timers 124 and 144 are loaded, the exhaust backpressure is measured and a system error is indicated at 118 in FIG. 4 if it is found to be beyond the predetermined limits at start up. If the backpressure is not beyond a predetermined limit, then the low frequency discriminator 134 is checked to see whether it is active. If the low frequency discriminator 134 is active, meaning the engine speed and corresponding signal frequency is within the range of the low frequency discriminator, the backpressure is compared to the low frequency backpressure set point 120. If the backpressure does not exceed the low frequency backpressure set point 120, then the low frequency timer is reset and the entire system is again reset.

However, if the backpressure is greater than the low frequency backpressure set point 120, the low frequency timer 124 is activated. If the duration for which the backpressure exceeds the backpressure set point is beyond the loaded timed interval, the replace element indicator 128 is actuated. If the timer 124 does not time out, the timer is reset and the process starts over.

If the low frequency discriminator 134 is not active, then the high frequency discriminator 138 is checked to see whether it is active. If the high frequency discriminator 138 is active, meaning the engine speed and corresponding signal frequency is within the range of the high frequency discriminator, then the backpressure is compared to the high frequency backpressure set point 140. If the backpressure is below the high frequency pressure set point, then the high frequency timer 144 is reset, the entire system is reset and the testing process starts over. However, if the backpressure is beyond the high frequency backpressure set point 140, then the high frequency timer 144 is actuated. If the timer 144 times out, a signal is sent to the replace filter indicator 128 and an indication that the filter needs replacement is given. If the timer is not timed out, then the system 110 is again reset and the process begins again.

Figure 7:
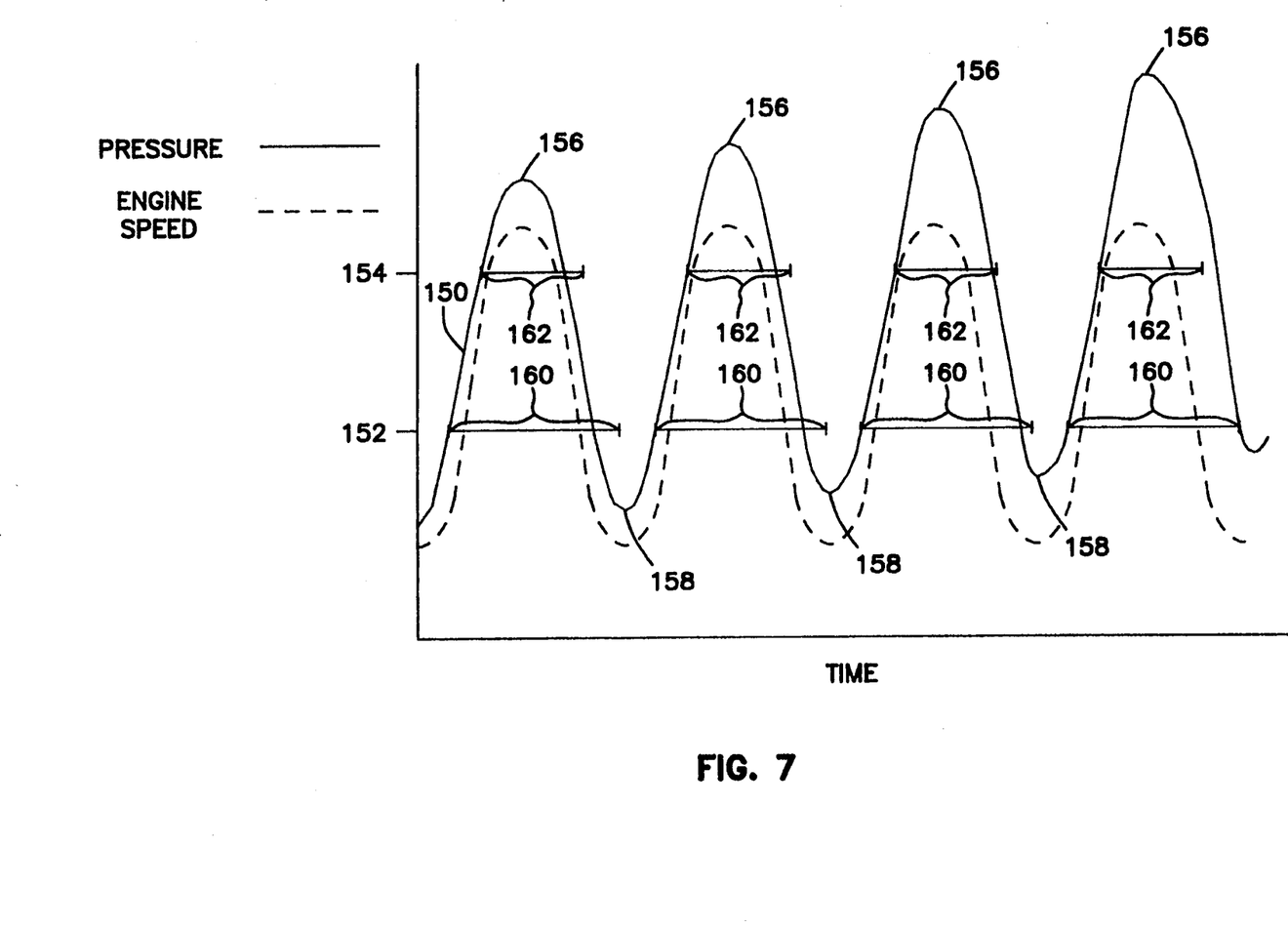
FIG. 7 shows a graph of backpressure in a filter element versus time for an interval after the element has been loading for a period of time, with high and low pressure set points utilized for the embodiment shown in FIG. 4.

The backpressure in the system is shown over time as the filter element loads with soot in FIG. 7. It can be appreciated that the pressure 150 has peaks 156 at which the throttle is at a higher range and troughs 158 at which the throttle is idling. It can be appreciated that as the equipment is operated, the backpressure will vary up and down as the accelerator is depressed and lifted. Although the cycles are shown for illustration as having the same period in FIG. 7, the period when the engine idles and when it is at full throttle will vary depending on operating conditions. It will be noted that the pressure at the idle 158 increases over time as the filter element becomes loaded. It will also be appreciated that the full throttle backpressure 156 also increases, but typically at a faster rate than the idle backpressure.

For the second embodiment, the graph shown in FIG. 7 has a first set pressure limit 152 from the set point 120 shown in FIG. 4 and a second pressure limit 154, from the set point 140 of FIG. 4. The limits 152 and 154 have associated timer intervals 160 and 162, respectively, which begin timing when the associated limits 152 and 154 are exceeded by the backpressure. Although the limits 152 and 154 are shown exceeded by every cycle in FIG. 7, the limits may not be initially exceeded for a great number of cycles. It can also be appreciated that the timed intervals 160 and 162 may not be exceeded for a great number of cycles. However, for illustrative purposes, values have been exaggerated and only a short period of the operation is shown.

The set points 152 and 154 and the intervals 160 and 162 can be varied independently depending upon the parameters and operating conditions of the equipment. The low frequency discriminator only samples when the engine is running at frequencies within a predetermined RPM range. Therefore, when backpressures exceed the low pressure set point 152 but the engine is operating at a higher RPM than that required for the discriminator, the interval timer will not be actuated. Similarly, the high frequency discriminator will allow sampling and comparison to the high backpressure set point 154 only when engine RPM's are within the range associated with the high frequency discriminator. In this manner, different warnings may be given when the intervals time out at different engine frequencies. Since operating conditions and uses of equipment may vary, it may be advantageous to have two different system indicators for the different uses of the equipment.

It can be appreciated that although only two sets of discriminators, timers and comparators are shown, it is possible that third and fourth sets may be added to sample in various other ranges. For example, the signal could be passed through a fast fourier transform to create a number of ranges.

In the present invention, peaks of pressure will not always indicate a loaded filter element as with prior devices. False readings are avoided, as only readings which indicate that the backpressure limit has been exceeded for given engine RPM's for a predetermined time interval will send a signal that the filter needs replacement. It can also be appreciated that independently variable set points and intervals, the present invention is easily adaptable to various types of equipment having various uses and operating conditions.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of detecting a loaded exhaust filter element in an engine exhaust system, comprising the steps of:
sampling the backpressure in the exhaust system upstream of the filter element in two or more ranges;
measuring the engine speed;
processing engine backpressure frequencies corresponding to the engine speeds so that only frequencies in predetermined ranges are sampled;
comparing the backpressure reading to a predetermined pressure level;
selecting timing periods at which the backpressure readings exceed the predetermined pressure level wherein signal frequencies sampled in a first range have a first timer interval and wherein frequencies sampled in a second range having a second timer interval;
wherein a backpressure reading exceeding the predetermined pressure level for a selectable predetermined period signals a loaded filter indicator wherein the first timer interval is different from the second timer interval.

2. A method according to claim 1, wherein pressures sampled at a first signal frequency are compared to a first pressure limit and wherein pressures sampled at a second frequency are compared to a second pressure limit.

3. A method of detecting a loaded exhaust filter element in an engine exhaust system, comprising the steps of:
sampling predetermined ranges of the backpressure in the exhaust system upstream of the filter element;
measuring the engine speed;
comparing the backpressure reading to a selectable predetermined pressure level for the engine speed;
providing timing periods at which the backpressure readings exceed the predetermined pressure level, wherein backpressure signal frequencies sampled in a first range have a first timer interval and wherein frequencies sampled in a second range have a second timer interval;
wherein a backpressure reading exceeding the predetermined pressure level for a selectable predetermined period signals a loaded filter indicator wherein the first timer interval is different from the second timer interval.

4. A method according to claim 3, wherein pressures at backpressure signal frequencies in two or more ranges are sampled.

5. A method according to claim 3, wherein pressures sampled at a first frequency are compared to a first pressure limit and wherein pressures sampled at a second frequency are compared to a second pressure limit.

6. An exhaust filter backpressure indicator for indicating when the exhaust filter element in an engine exhaust system is filled, comprising:
sensing means for measuring the backpressure in the exhaust system;
indicating means for indicating whether the exhaust filter element is loaded;
first comparator means for comparing the backpressure to a first predetermined limit;
second comparator means for comparing the backpressure to a second predetermined limit;
timing means for measuring the period at which the backpressure exceeds the predetermined limits;
first delaying means for preventing signalling a loaded filter element reading to the indication means until the backpressure has exceeded the first predetermined limit for a predetermined first period; and
second delaying means for preventing signalling a loaded filter element reading to the indication means until the backpressure has exceeded the second predetermined limit for a predetermined second period wherein the predetermined first period is different from the predetermined second period.

7. An indicator according to claim 6, further comprising first engine speed discriminating means for discriminating a first sampling range of engine operating speeds for the first comparator, and second engine speed discriminating means for discriminating a second sampling range of engine operating speeds for the second comparator.

8. An indicator according to claim 6, further comprising signal frequency filtering means for filtering signals from the sensing means.

* * * * *